United States Patent [19]

Walker

[11] 3,902,021

[45] Aug. 26, 1975

[54] NUISANCE CALL TRAP CIRCUIT

[75] Inventor: Anthony B. Walker, Lorain, Ohio

[73] Assignee: Lorain Products Corporation, Lorain, Ohio

[22] Filed: Feb. 21, 1974

[21] Appl. No.: 444,287

[52] U.S. Cl......... 179/18 FH; 179/27 DB; 179/17 A

[51] Int. Cl.[2] ........................................... H04Q 3/72

[58] Field of Search......... 179/18 FH, 27 DB, 17 A, 179/5.5

[56] References Cited

UNITED STATES PATENTS

| | | | |
|---|---|---|---|
| 3,529,096 | 9/1970 | Hosking et al. | 179/18 FH |
| 3,600,526 | 8/1971 | Pilkinton | 179/175.2 C |

*Primary Examiner*—Kathleen H. Claffy
*Assistant Examiner*—C. T. Bartz
*Attorney, Agent, or Firm*—Edward C. Jason

[57] ABSTRACT

A trap circuit for preventing the disconnection of a telephone line over which a nuisance call is being made and thereby facilitating the tracing of the origin of the call. The trap circuit of the invention includes a trap network for maintaining the energization of the "A" or line-holding relay until the called party hangs up his handset, and a time-delay network for delaying the energization of the trap network for a predetermined time after pickup by the called party. The time-delay network assures that the trap network operates in the desired manner without regard to the presence or absence of a voltage booster circuit in any subscriber line which becomes connected to the station serviced by the trap circuit.

3 Claims, 1 Drawing Figure

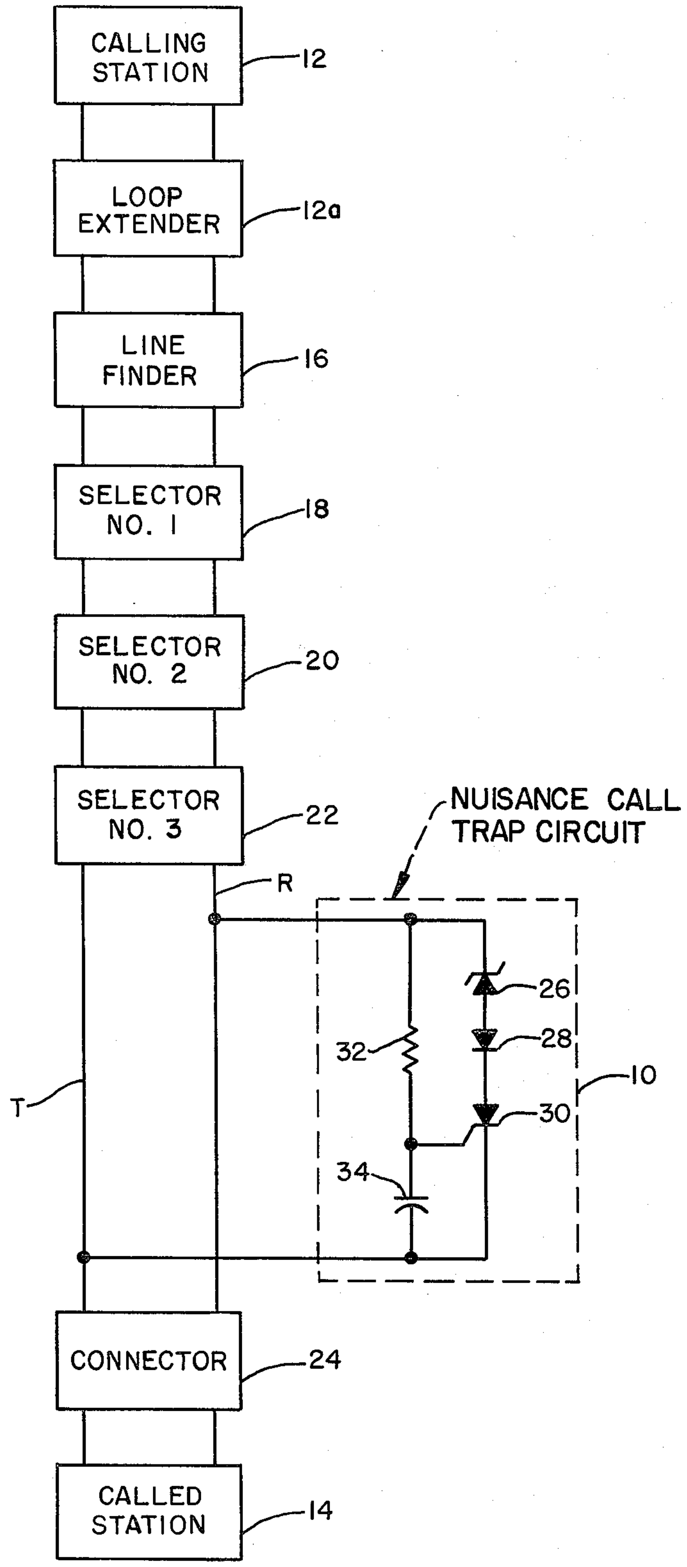
CALLING STATION
12
LOOP EXTENDER
12a
LINE FINDER
16
SELECTOR NO. 1
18
SELECTOR NO. 2
20
SELECTOR NO. 3
22
NUISANCE CALL TRAP CIRCUIT
R
26
28
32
10
T
30
34
CONNECTOR
24
CALLED STATION
14

NUISANCE CALL TRAP CIRCUIT

BACKGROUND OF THE INVENTION

The present invention is directed to circuitry for facilitating the identification of the station from which a nuisance type telephone call is made and is directed more particularly to circuitry of the above character which operates in the desired manner in the presence of telephone system voltage booster circuits.

Nuisance type telephone calls, that is, telephone calls which are made for purposes of harassment or disruption are vexing problems to a large number of telephone system subscribers. One reason for the large number of calls of this type is the difficulty of determining their point of origin. This difficulty, in turn, results from the widespread utilization of telephone system switchgear which allows the calling party to break the connections between his own station and the station of the called party by simply hanging up his handset. In order to reduce the likelihood that the making of nuisance calls will go unpunished, a variety of nuisance call trapping circuits have been devised. One of these is a trap circuit which enables the called party to hold the line over which a nuisance call has been placed in contact with the central office after the nuisance caller has hung up his handset. This allows the origin of the call to be determined at leisure by normal line tracing procedures.

While trap circuits of the above character operate satisfactorily in some telephone system environments, they are sometimes incompatible with telephone systems which utilize voltage booster circuits or loop extenders, particularly those which reverse the polarity of the boost voltage during normal telephone system operation. This is because loop extender circuits have been found to be unable to reverse the polarity of the boost voltage in the presence of previously available trap circuits, a condition which prevented the completion of legitimate calls to subscribers whose lines were serviced by such trap circuits. Since loop extender circuits are being used in connection with ever increasing numbers of subscriber lines, and since trap circuits are most often applied to lines which service fire and police stations, it can be seen that the above described incompatibility has potentially dangerous consequences to those in need of emergency assistance.

In accordance with the present invention, there is provided improved nuisance call trap circuitry which operates in the desired manner to prevent the premature termination of nuisance calls and which is compatible with all types of voltage booster circuits.

SUMMARY OF THE INVENTION

It is an object of the invention to provide an improved nuisance call trap circuit.

Another object of the invention is to provide a nuisance call trap circuit which does not interfere with the placing of calls over subscriber lines which are serviced by voltage booster circuits.

Still another object of the invention is to provide a nuisance call trap circuit which inhibits the desired line trapping activity during the time when voltage booster circuits connected to the line are changing state.

Yet another object of the invention is to provide trap circuitry of the above character which is simple, compact and easy to install.

DESCRIPTION OF THE DRAWINGS

The single FIGURE is a combined block-schematic diagram showing schematically the circuit of the invention and in block form the environmental telephone circuitry with which it is used.

DESCRIPTION OF THE INVENTION

Referring to the FIGURE, there is shown at 10 an improvement in nuisance call trap circuits of the type used for placing control of the connections between a calling station 12 and a called station 14 in the hands of a person at the called station and thereby enabling that person to hold the line while the location of the calling station is being determined by conventional line tracing techniques. In the present embodiment, trap circuit 10 is connected across conductors R and T which connect stations 12 and 14 through a central office switch train including a line finder 16, first, second and third selectors 18, 20 and 22 and a connector 24.

Line finder 16 and selectors 18 through 22 serve to route the call from calling station 12 to a connector such as 24 which services called station 14. Connector 24, in turn, completes the connection of the calling and called parties and, via the "A" or line-holding relay, holds them in contact until the calling party hangs up. Because the nature of the above line finder, selector and connector circuits is well and widely known, these networks are shown in block form only.

Because the maintenance of a connection between the calling and called parties is dependent upon the flow of current through station 12 and the "A" relay of connector 24, it has been possible for a nuisance caller to escape detection by simply hanging up his handset to break the connection before the positions of the selectors can be determined. A trap circuit prevents this by maintaining the connections of the caller's line until both the calling and called parties have hung up. This is accomplished by establishing, after pickup by the called party, a current between conductors R and T which is sufficient to hold up the "A" relay and thus make it appear to connector 24 that the calling party is still there after he has hung up. As a result, the called party can, by keeping his handset off-hook, hold the line until the selector networks can be examined for tracing purposes.

Prior to the present invention, trap circuits of the above character included a zener or breakdown diode and a current blocking diode connected in series between conductors R and T. In such circuits, the zener diode serves to block current flow until the voltage between conductors R and T is of a polarity and magnitude which indicates an off-hook condition at the called station and hang-up at the calling station. Thereafter, the zener diode conducts to draw holding current through the line-holding relay in the manner of a voltage clamp. The current blocking diode, in turn, serves to block current flow through the zener diode when the polarity of the voltage between conductors R and T reverses.

While the above circuitry operated satisfactorily in telephone systems wherein no subscriber lines were serviced by loop extenders, it prevented the completion of a call from a calling station such as 12 which was serviced by a loop extender such as 12*a* to a called station such as 14 which was serviced by a trap circuit. This is for the reason that the clamping activity of the trap circuit prevents the voltage booster circuit from seeing a voltage sufficient to initiate a reversal in the polarity of the boost voltage. As a result, a great number of calling subscribers whose lines were serviced by loop extenders could not reach called subscribers, such as the police department, which have lines that require trap circuits. One type of loop extender circuit is described in the U.S. patent of Charles W. Chambers, Jr., U.S. Pat. No. 3,639,636, entitled "Multistate Voltage Booster Circuit For Telephone Systems."

To the end that the trap circuit of the invention may operate in the desired manner in the presence of any of a plurality of types of loop extender circuits, network 10 includes voltage responsive switching means which here takes the form of a zener diode 26, blocking means which here takes the form of a diode 28 and time delay switching means which here takes the form of a thyristor 30, a resistor 32 and a capacitor 34. Diodes 26 and 28 serve the respective breakdown and blocking functions described previously in connection with previously available trap circuits. The above time delay circuitry, in turn, serves to inhibit the line-trapping activity of diodes 26 and 28 for a time sufficient to allow loop extender 12*a* to reverse the polarity of its boost voltage and, thereafter, to allow diodes 26 and 28 to trap the line in the normal manner. Thus, the desired voltage boosting and line trapping activities are made to occur within separate time intervals when they cannot interfere with one another.

A typical line trapping situation will now be described. As a nuisance caller lifts his handset, his transmitter-receiver becomes connected to the central office dialing equipment through loop extender 12*a* which provides his transmitter-receiver with a boosted d-c operating voltage. After his call has been routed to the called station and answered by the called party, connector 24 reverses the polarity with which the central office battery supplies d-c operating current to the calling party to render conductor R positive from conductor T. As this occurs, loop extender 12*a* begins to change its operative state to reverse the polarity of the boost voltage and thereby accommodate the above described central office polarity reversal. At the same time, the non-conduction of thyristor 30 inhibits line trapping activity and capacitor 34 begins charging toward the voltage between conductors R and T through resistor 32.

In accordance with one feature of the present invention, the time required for capacitor 34 to charge to a voltage sufficient to place thyristor 30 in a condition which will allow line trapping activity in diodes 26 and 28 is long in relation to the time required for loop extender 12*a* to reverse the polarity of the d-c boost voltage provided thereby. As a result, polarity reversal of the loop extender occurs and the d-c operating current in the subscriber line is at its boosted, steady state value before line trapping activity can begin. Accordingly, because the time delay circuit causes polarity reversals and line trapping to occur in separate, respective intervals of time, the voltage boosting activity of loop extender 12*a* cannot combine with line trapping activity of trap circuit 10 to prevent the completion of the call from station 12 to station 14.

In accordance with another feature of the present invention, the time-delay introduced by thyristor 30, resistor 32 and capacitor 34 is set at a value, e.g. 50 milliseconds, which is short in relation to the duration of any possible nuisance call. This assures that the nuisance caller cannot complete his message and hang up before his line becomes trapped. Thus, the time delay provided by trap network 10 is sufficient to allow successful completion of a call but not sufficient to allow a nuisance caller to hang-up soon enough to escape identification.

Upon hang-up by the nuisance caller, the voltage between conductors R and T rises to a level sufficient to breakdown zener diode 26. The latter condition, in turn, causes trap circuit 10 to maintain the connection between the calling and called stations. This allows the called party to initiate the line-tracing procedures which result in the identification of the telephone used by the calling party. This trapped condition will continue until the called party hangs up his handset. This is because, as previously described, trap circuit 10 conducts between conductors R and T a current sufficient to hold up the "A" or line-holding relay within connector 24. Thereafter, as the called party hangs up, the trap circuit is released as the resultant disconnection of the central office battery causes diodes 26 and 28 and thyristor 30 to become non-conducting. At this time, the telephone system circuitry of the drawing is in the condition it was in before the making of the nuisance call and is in condition to receive and trap additional nuisance calls.

In view of the foregoing, it will be seen that a trap circuit constructed in accordance with the invention is adapted to trap and release calls made to a called station serviced thereby and is adapted to operate without regard to the presence or absence of a voltage booster circuit in the subscriber line of the calling party.

It will be understood that the above described embodiment is for descriptive purposes only and may be changed or modified without departing from the spirit and scope of the appended claims.

What is claimed is:

1. In a nuisance call trap circuit for placing control of the connections of a subscriber line utilized by a calling party in the hands of the called party, in combination, a plurality of terminals for connecting the trap circuit in energizing relationship to a line-holding relay, a voltage breakdown element, controllable switching means having a power circuit and a control circuit, means for connecting said breakdown element and the power circuit of said controllable switching means in series across said terminals and means for energizing said control circuit within a predetermined time after the energization of the line-holding relay, said predetermined time being greater than the time required for a voltage booster circuit to reverse the polarity of its voltage.

2. In a nuisance call trap circuit for placing control of the connections of a subscriber line utilized by a calling party in the hands of the called party, in combination, a plurality of terminals for connecting the trap circuit in energizing relationship to a line-holding relay, a zener diode, a thyristor having an anode, a cathode and a gate, means for connecting said diode and the anode and cathode of said thyristor in series between said terminals, a resistor, a capacitor, means for connecting said resistor and capacitor in series between said terminals, means for connecting the gate of said thyristor to the junction of said resistor and capacitor, said resistor and capacitor serving to establish a time delay which is greater than the time required for a voltage booster to reverse the polarity of its voltage.

3. In a nuisance call trap circuit for placing control of the connections of a subscriber line utilized by a calling party in the hands of the called party, in combination, a plurality of terminals for connecting the trap circuit in energizing relationship to a line-holding relay, voltage responsive conducting means for conducting current when the voltage thereacross exceeds a predetermined value and for blocking the flow of current when the voltage thereacross is less than said predetermined value, switching means, timing means for delaying the turn on of said switching means for a predetermined time, said predetermined time being greater than the time required for a voltage booster circuit to reverse the polarity of its voltage, means for connecting said voltage responsive means and said switching means in series between said terminals, and means for connecting said timing means to said terminals and to said switching means.

* * * * *